United States Patent [19]

Yamada

[11] Patent Number: 5,394,190
[45] Date of Patent: Feb. 28, 1995

[54] VIDEO SIGNAL ENCODING APPARATUS

[75] Inventor: Masazumi Yamada, Moriguchi, Japan

[73] Assignee: Matsushita Electric Industrial Co., Ltd., Osaka, Japan

[21] Appl. No.: 76,425

[22] Filed: Jun. 14, 1993

[30] Foreign Application Priority Data

Aug. 4, 1992 [JP] Japan .................. 4-207758

[51] Int. Cl.⁶ .................. H04N 7/133; H04N 7/137
[52] U.S. Cl. .................. 348/411; 348/413; 348/402; 348/416
[58] Field of Search .................. 358/133, 136, 135; 348/411–416, 409, 402, 394, 390, 384, 699; H04N 7/137, 7/133

[56] References Cited

U.S. PATENT DOCUMENTS

| | | | |
|---|---|---|---|
| 4,833,535 | 5/1989 | Ozeki et al. | 358/135 |
| 5,036,393 | 7/1991 | Samad et al. | 348/699 |
| 5,068,724 | 11/1991 | Krause et al. | 348/402 |
| 5,091,782 | 2/1992 | Krause et al. | 358/135 |
| 5,093,720 | 3/1992 | Krause et al. | 348/699 |
| 5,159,448 | 10/1992 | Kojama | 358/135 |
| 5,159,451 | 10/1992 | Faroudja et al. | 348/448 |
| 5,191,414 | 3/1993 | Sugiyama | 358/136 |
| 5,228,028 | 7/1993 | Cucchi et al. | 348/402 |
| 5,235,419 | 8/1993 | Krause | 358/135 |
| 5,280,350 | 1/1994 | DeHaan et al. | 348/699 |

OTHER PUBLICATIONS

"Line Transmission on Non–Telephone Signals", International Telecommunication Union, Geneva, 1990, pp. 1–9.

Primary Examiner—Tommy P. Chin
Assistant Examiner—Vu Le
Attorney, Agent, or Firm—Wenderoth, Lind & Ponack

[57] ABSTRACT

A field to be encoded is divided into blocks. Then, first, second, and third motion vectors relative to data of a block of the field to be encoded are calculated from data of an m-th preceding field (m: even), data of an n-th preceding field (n: odd), and data of an interpolated image produced from the n-th preceding field. First, second, and third prediction signals are produced from the first motion vector and the m-th preceding field data, the second motion vector and the n-th preceding field data, and the third motion vector and the interpolated image data, respectively. In succession, a first difference signal between the first prediction signal and the block data to be encoded, a second difference signal between the second prediction signal and the block data to be encoded, and a third difference signal between the third prediction signal and the block data to be encoded are calculated and compared each other. As a result of comparison, one of the first, second, and third difference signals is selected and encoded.

6 Claims, 4 Drawing Sheets

VIDEO SIGNAL ENCODING APPARATUS

BACKGROUND OF THE INVENTION

1. Field of the Invention

The present invention relates to an encoding apparatus for performing a bit rate reduction coding of a video signal to compress its information for recording and transmission.

2. Description of the Prior Art

Such a video signal encoder is known that eliminates redundancy of information in time domain by motion compensation. A prediction process in the motion compensation is executed on a frame-by-frame or field-by-field basis. Such video signal encoder is shown in CCITT Recommendation H.261, "VIDEO CODER FOR AUDIOVISUAL SERVICES AT px64 kbit/s" (approved on December 1990).

The existing television systems employ the known interlaced scanning method for scanning every alternate lines in a TV picture, whereby each frame has time and spatial delays. Hence, when the TV picture is not a completely still image, the redundancy can hardly be reduced by the conventional interframe prediction technique.

On the other hand, the field-by-field prediction may be considered to process each field (not frame) of the TV signal by prediction from data of the preceding field. The advantage of this process is that the time distance between fields is half that between frames. However, the prediction signal tends to be out-of-phase from the scanning of data of a block to be encoded and will thus be declined in accuracy.

SUMMARY OF THE INVENTION

It is an object of the present invention to provide an encoding apparatus capable of encoding a video signal at a higher efficiency through eliminating a more amount of time redundancy of the interlaced scanned image, as compared with the prior art.

To achieve the above object, a video signal encoding apparatus according to the present invention for bit rate reduction encoding an interlaced scanned video signal comprises: a block former, the block former for dividing data of a field to be encoded into blocks each block being composed of a specified number of pixel data; a first memory, the first memory storing decoded data of m-th and n-th preceding field counted from the field to be encoded, where m is an even number and n is an odd number; a scanning line interpolator, the interpolator interpolating a given number of scanning lines by using the data of the n-th preceding field to produce data of an interpolated field; second memory, the second memory storing the data of the interpolated field; a motion detector, the motion detector detecting motions of a block to be coded with respect to corresponding blocks in the m-th preceding field, the n-th preceding field and the interpolated field, and for producing first through third motion vectors indicating the respective detected motions; a predicted data extractor, the extractor extracting first through third predicted data from the data of the m-th preceding field, the n-th preceding field and the interpolated field based on the first through third motion vectors, respectively; a difference calculator, the calculator calculating difference of the data of the block to be coded from the first through third predicted data to obtain first through third difference signals indicating the respective calculated differences; and a selective encoder, the encoder selectively encoding one of the data of the block to be coded and the first through third difference signals to obtain an output coded data so that the output coded data satisfies a predetermined condition. Preferably, the selective encoder may selectively encode one of the data of the block to be coded and the first through third difference signals so that the the output coded data quantity is minimized as compared with the cases of encoding the remaining, non-selected data or signals.

Accordingly, the scanning-line interpolation permits production of a desired predicted image whose vertical timing is in phase, as compared with an out-of-phase result in the conventional interfield prediction. The prediction can be carried out at higher accuracy by adaptively selecting a most appropriate one of the prediction using the interpolated image, the interframe prediction and the interfield prediction, to realize a highly efficient encoding process.

DESCRIPTION OF THE PREFERRED EMBODIMENTS

Figure 1:
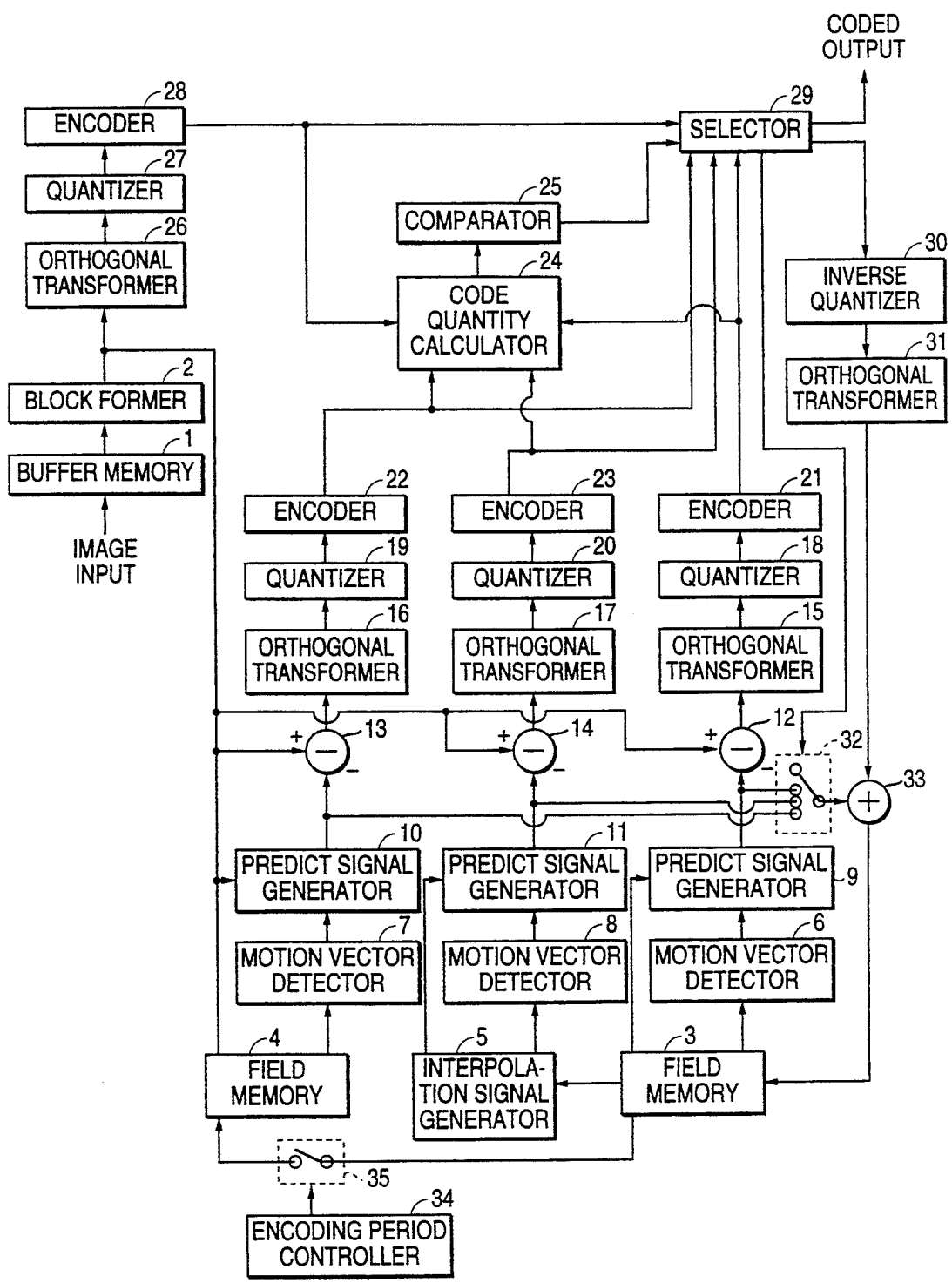
FIG. 1 is a block diagram of an encoding apparatus showing a first embodiment of the present invention.
Figure 2:
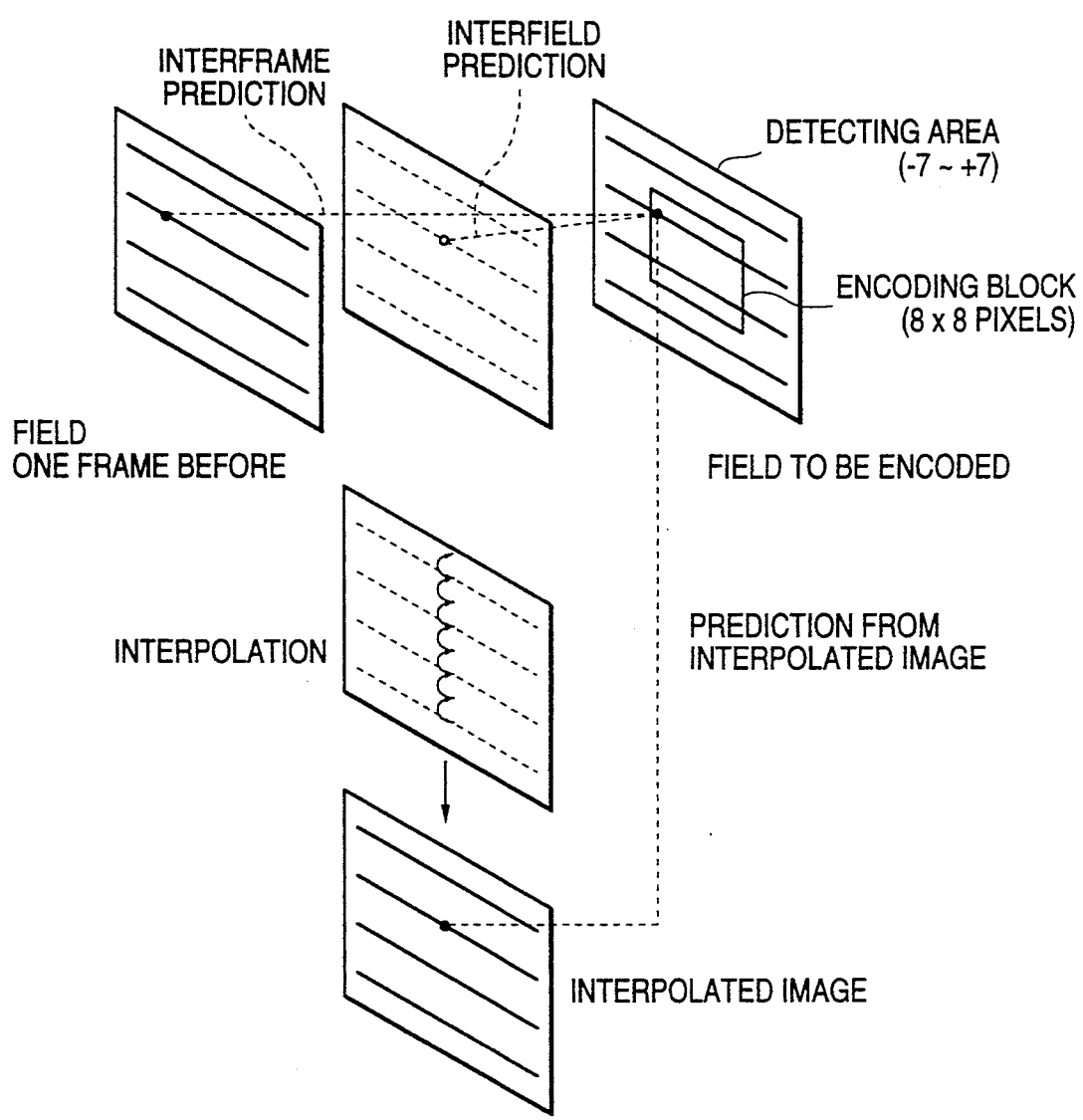
FIG. 2 is a view explaining a prediction process and an interpolation process of the present invention.

FIG. 1 illustrate a block diagram of an encoding apparatus of a first embodiment of the present invention. A buffer memory 1 receives a video signal and stores its data of each field. One field data of the video signal is divided by a block former 2 into blocks each containing 8×8 matrix of pixels. A field memory 3 holds decoded data of the previous field while a field memory 4 holds decoded data of the field one frame before. An interpolation signal generator 5 receives the decoded data of the previous field from the field memory 3 and produces a scanning-line interpolated data from decoded data within a motion vector detecting area (covering up to −7 to +7 pixels in both vertical and horizontal directions from the 8×8 pixel matrix) for a block to be encoded, as shown in FIG. 2. As clear from FIG. 2, the scanning-line interpolation, unlike the conventional interfield interpolation, will produce an interpolated prediction image whose vertical timing is in phase, thus ensuring more efficient prediction with respect to a small movement. Most appropriate one may be adaptively selected from the prediction using the interpolated image, the interframe prediction and the interfield prediction so that the quantity of the coded data becomes minimum in each block. Accordingly, the efficiency of the prediction will be increased to realize a highly efficient encoding.

The two field memories 3 and 4 are coupled to motion vector detectors 6, 7 respectively and the interpolation signal generator 5 is connected to a motion vector detector 8. The three motion vector detectors 6, 7, and 8 examine positioned relationships of the decoded data of the previous field, the decoded data of the field one frame before, and the interpolated data respectively relative to reference data corresponding to the data of the block to be encoded derived from the block former 2 in the motion vector detecting area to determine three positional relationships data where the prediction errors are smallest, and then, deliver their respective positional relationships data as first, second and third motion vectors.

The three motion vector detectors 6, 7, and 8 are coupled to prediction signal generators 9, 10, and 11 respectively which are also connected to the field memory 3, the interpolation signal generator 5, and the field memory 4 respectively. The prediction signal generator 9 produces a first prediction signal by shifting the decoded data of the previous field of the field memory 3 by the value of the first motion vector determined by the motion vector detector 6 from the reference data which corresponds to the block to be encoded. Similarly, the prediction signal generator 10 produces a second prediction signal by shifting the decoded data of the field one frame before fed from the field memory 4 by the value of the second motion vector determined by the motion vector detector 7 from the reference data which corresponds to the block to be encoded. The prediction signal generator 11 produces a third prediction signal by shifting the data of the interpolated signal from the interpolation signal generator 5 by the value of the third motion vector determined by the motion vector detector 8 from the reference data which corresponds to the block to be encoded.

The outputs of the three prediction signal generators 9, 10, and 11 are transferred to subtractors 12, 13, and 14 respectively which are also coupled to the block former 2. The subtractors 12,13, and 14 calculate differences of the first, second, and third prediction signals from the data of the block to be encoded and deliver the calculated results as first, second and third difference signals. The three, first, second and third, difference signals are then orthogonal transformed by orthogonal transformers 15, 16, and 17 respectively. The orthogonal transformers 15, 16, and 17 are coupled to three quantizers 18, 19, and 20 respectively where the output first, second and third transformed coefficients of the orthogonal transformers 15, 16, and 17 are quantized. Three encoders 21, 22, and 23 are respectively coupled to the generators 18, 19, and 20 for encoding the three quantized data from the quantizers 18, 19, and 20 to obtain three coded data, and outputs the three coded data together with the three quantized data.

The block former 2 is coupled also to an orthogonal transformer 26 which is coupled to a quantizer 27 which is coupled to an encoding apparatus 28 for orthogonal transforming, quantizing and encoding respectively to obtain coded data of the block to be encoded.

The three output coded data from the encoders 21, 22, and 23 are fed to a code quantity calculator 24 where their code amounts are calculated. Quantities of the four different mode coded outputs, the three coded data outputs of the encoders 21, 22, and 23 and the coded data output of the encoder 28, are compared by a comparator 25. The comparator 25 outputs a selection signal including a mode giving a minimum coded data quantity. The minimum quantity coded data and the corresponding quantized coefficients are selected and passed by a selector 29 responsive to the selection signal from the comparator 28. The selected mode coded data output of the selector 29 is delivered as an output of the video signal encoding apparatus.

The selector 29 is coupled also to an inverse quantizer 30 where the quantized coefficients of the selected mode are inverse quantized. The output of the inverse quantizer 30 is orthogonally transformed to its difference signal form by an orthogonal transformer 31. Another selector 32 is provided for selecting one of a data of value zero and the three predicted data from the prediction signal generators 9, 10, and 11 in response to a signal indicating the selected mode from the selector 29. The selected output data of the selector 32 is added to the output data of the orthogonal transformer 31 by an adder 33. The added output data of the adder 33 is stored in the-field memory 3. More specifically, the difference signal reconstructed by the orthogonal transformer 31 is decoded to a video signal by being added with the predicted signal from the selector 32 in the adder 33. When the output of the encoding apparatus 28 is selected by the selector 29 for a mode of directly transforming and encoding the input data of the block to be encoded, the selector 32 selects the zero data because the output of the orthogonal transformer 31 is a video signal and does not need to be added with any predicted signal.

The decoded video signal from the adder 33 is stored in the field memory 3 and used for prediction of the succeeding field. After processing of one field data, a switch 35 is closed by a command signal from an encoding period controller circuit 34 to feed the video signal stored in the field memory 3 to the field memory 4 for prediction of the succeeding field.

Figure 3:
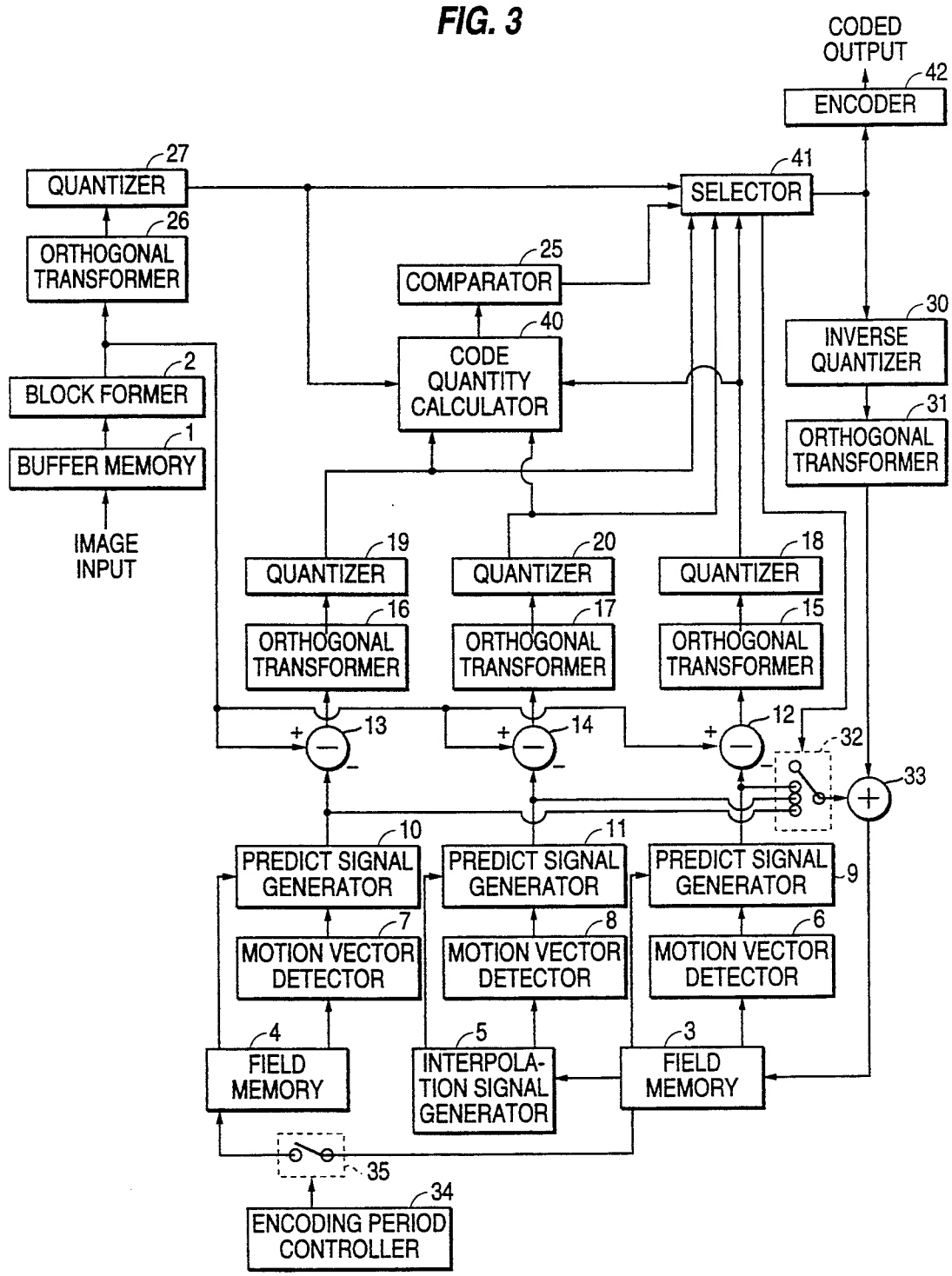
FIG. 3 is a block diagram of an encoding apparatus showing a second embodiment of the present invention.

FIG. 3 is a block diagram of another video signal encoding apparatus showing a second embodiment of the present invention. In this embodiment, the coded data quantities to be compared in the comparator 25 are produced by a code quantity estimator 40. That is, the code quantity calculator 24 and the encoders 21, 22, 23, and 28 in the first embodiment are performed.

The code quantity estimator 40 estimates the code amounts from the quantized coefficients outputted from the quantizers 18, 19, 20, and 27. The code quantity estimator 40 may have a memory having stored therein data showing code amounts corresponding to all possible quantized coefficients. The functions of the comparator 25 and a selector 41 are the same as those of the comparator 25 and selector 29 in the first embodiment to select a quantized output giving a minimum code quantity. The quantized output selected by the selector 41 is then fed to an inverse quantizer 30 for inverse quantization and also, to an encoding apparatus 42 where it is encoded to obtain an encoded output of the video signal encoding apparatus of the second embodiment. The entire arrangement of the second embodiment will thus be reduced in size as compared with that of the first embodiment. The accuracy of selection depends much on the performance of the code quantity estimator 40.

Figure 4:
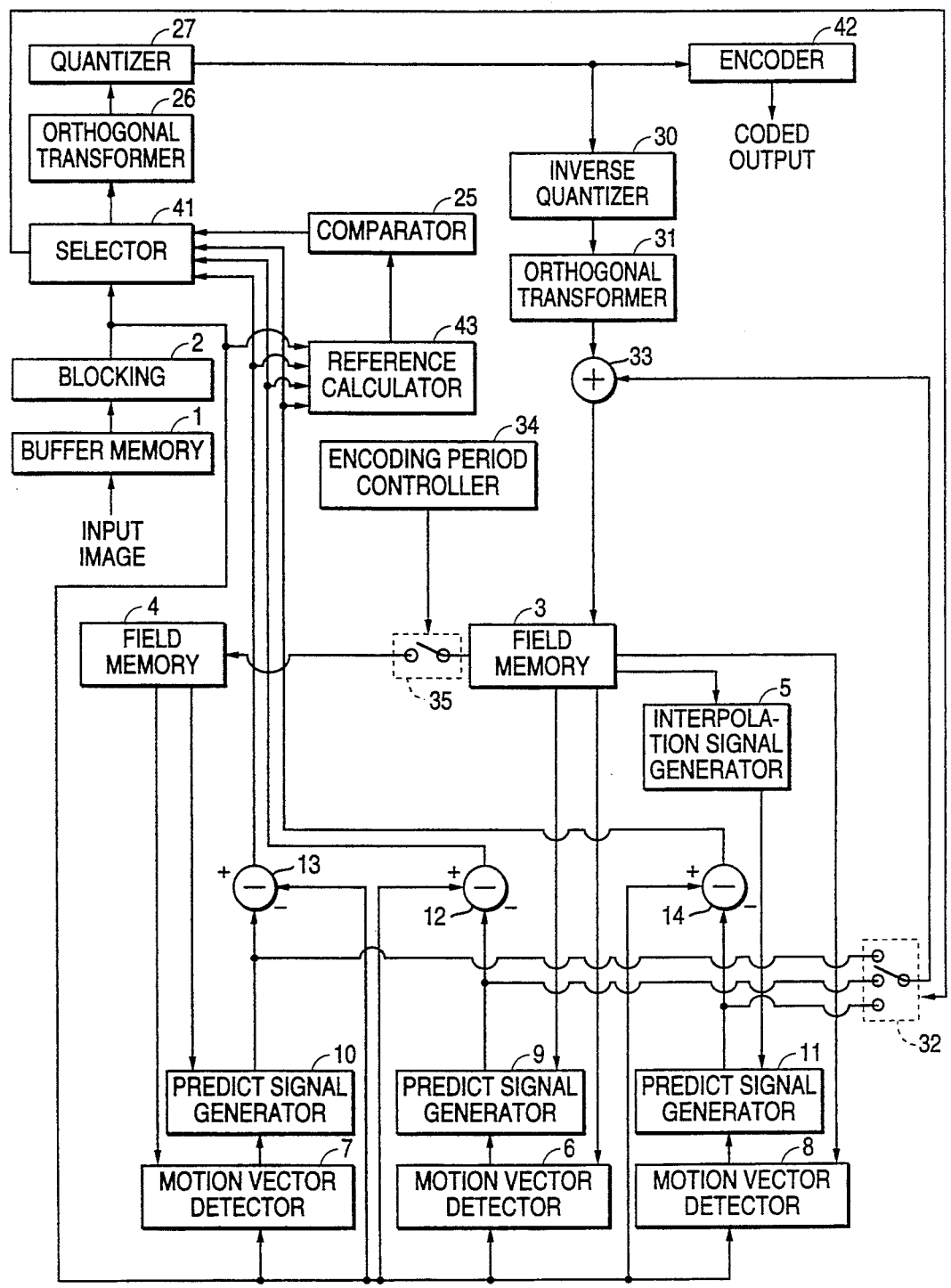
FIG. 4 is a block diagram of an encoding apparatus showing a third embodiment of the present invention.

FIG. 4 is a block diagram of a further video signal encoding apparatus showing a third embodiment of the present invention. In this embodiment, the data to be compared in the comparator 25 are produced by a decision reference calculator 43 calculating mode decision references directly from the outputs of the three subtractors 12, 13, and 14 and the output of the block former 2, instead of the code quantity estimator 40 of the second embodiment. The entire arrangement of the third embodiment will be smaller in size than those of the first and second embodiments.

The operation of the third embodiment will now be explained in more detail. Similar to the first and second embodiments, the subtractors 12,13, and 14 calculate differences between the data of the block to be encoded and the respective predicted signals from the three prediction signal generators 9, 10, and 11. The reference calculator 43 calculates a square sum of each of the three difference signals from the subtractors 12, 13, and 14 and the output of the block former 2. The four square sums are then fed to the comparator 25 where they are compared and the smallest of them is selected. The comparator 25 outputs a selection signal indicating a mode giving the smallest square sum. Accordingly, in response to the selection signal, the selector 41 passes one of the outputs of the block former 2 and the subtractors 12, 13, and 14 which gives the smallest square sum via the orthogonal transformer 26 for orthogonal transformation and the quantizer 27 for quantization to the encoding apparatus 42 for encoding. The output of the encoding apparatus 42 is thus delivered as an encoded output of the video signal encoding apparatus. Although the square sum of each signal is calculated as a mode decision reference in the reference calculator 43, any other reference value, e.g. an absolute value sum, may be used.

As set forth above, the video signal encoding apparatus of the present invention can perform bit rate reduction encoding of video signal data of an interlaced image at high efficiency by combination and adaptive selection of the interfield prediction, the interframe prediction, and the prediction with an interpolated image.

It should be understood that the size of each block in examining a difference of data between two fields is not limited to 8×8 pixels and other pixel matrices including 16×16, 16×8, 8×16, 8×4, and 4×4 may be employed with equal success. Also, the motion vector detecting area ranging −7 to +7 pixels is not limitative and may be determined to any appropriate size. Although the prediction is based on the previous field and the field one frame before, any field data may be utilized as long as its phase matches the interlacing phase. More particularly, the prediction will be executed from fields including two different fields, m-th and n-th p receding fields counted from the present field where m is an even number and n is an odd number (m, n may be either positive or negative). The number of the prediction fields and of the interpolated images for comparison will be of no limitation. Although the orthogonal transformation is used before the quantization in a pre-encoding process, any other method, e.g. vector quantization, may be utilized with equal success.

What is claimed is:

1. A video signal encoding apparatus for bit rate reduction encoding an interpolated scanned video signal comprising:
    a block former, said block former dividing data on a field to be encoded into blocks, each block being composed of a specified number of pixel data;
    a first memory, said first memory storing decoded data of m-th and n-th preceding fields counted from the field to be encoded, where m is an even number and n is an odd number;
    a scanning line interpolator, said interpolator interpolating a given number of scanning lines by using the data of the n-th preceding field to produce data of an interpolated field;
    a second memory, said second memory storing the data of the interpolated field;
    a motion detector, said motion detector detecting motions of a block to be coded with respect to corresponding blocks in the m-th preceding field, the n-th preceding field and the interpolated field, and for producing first through third motion vectors indicating the respective detected motions;
    a predicted data extractor, said extractor extracting first through third predicted data from the data of the m-th preceding field, the n-th preceding field and the interpolated field based on the first through third motion vectors respectively;
    a difference calculator, said calculator calculating a difference of the data of the block to be coded from the first through third predicted data to obtain first through third difference signals indicating the respective calculated differences; and
    a selective encoder, said selective encoder selectively encoding one of the data of the block to be coded and the first through third difference signals to obtain an output coded data so that the output coded data satisfies a predetermined condition.

2. An encoding apparatus according to claim 1, wherein said selective encoder selectively encodes said one of the data of the block to be coded and the first through third difference signals to minimize the output coded data quantity.

3. An encoding apparatus according to claim 1, wherein said selective encoder includes:
    first through fourth transformers, said transformers respectively transforming the data of the block to be coded and the first through third difference signals to obtain first through fourth transformed signals;
    first through fourth quantizers, said quantizers respectively quantizing the first through fourth transformed signals to obtain first through fourth quantized data;
    first through fourth encoders, said first through fourth encoders respectively encoding the first through fourth quantized data to obtain first through fourth coded data;
    a code quantity calculator, said code quantity calculator calculating the quantity of each of the first through fourth coded data to obtain first through fourth quantity data indicating quantities of the first through fourth coded data, respectively;
    a code quantity comparator, said code quantity comparator comparing the first through fourth quantity data with one another to select one of the first through fourth quantity data that satisfies a predetermined condition and for outputting a selection signal indicating which of the first through fourth quantity data is selected; and
    a selector responsive to the selection signal, said selector selecting one of the first through fourth coded data as the output coded data.

4. An encoding apparatus according to claim 1, wherein said selective encoder includes:
    first through fourth transformers, said transformers respectively transforming the data of the block to be coded and the first through third difference signals to obtain first through fourth transformed signals;
    first through fourth quantizers, said quantizers respectively quantizing the fist through fourth transformed signals to obtain first through fourth quantized data;
    a code quantity estimator, said estimator estimating the quantity of each of first through fourth coded data which would respectively be obtained by encoding the first through fourth quantized data to obtain first through fourth quantity data indicating quantities of the first through fourth coded data, respectively;

a code quantity comparator, said code quantity comparator comparing the first through fourth quantity data with one another to select one of the first through fourth quantity data that satisfies a predetermined condition and for outputting a selective signal indicating which of the first through fourth quantity data is selected;

a selector responsive to the selection signal, said selector selecting one of the first through fourth quantity data; and an encoder, said encoder encoding a quantity data selected by said selector to obtain the output coded data.

5. An encoding apparatus according to claim 1, wherein said selective encoder includes:

a decision reference calculator, said decision reference calculator calculating first through fourth specific decision references from the data of the block to be coded and the first through third difference signals, respectively;

a decision reference comparator, said decision reference comparator comparing the first through fourth decision references with one another to select one of the first through fourth decision reference that satisfies a predetermined condition and for outputting a selection signal indicating which of the first through fourth decision reference is selected;

a selector responsive to the selection signal, said selector selecting one of the data of the block to be coded and the first through third difference signals;

a transformer, said transformer transforming a selected output of the selector to obtain a transformed signal;

a quantizer, said quantizer quantizing the transformed signal to obtain a quantized data; and an encoder, said encoder encoding the quantized data to obtain the output coded data.

6. An encoding apparatus according to claim 1, wherein said selective encoder includes:

a square sum calculator, said square sum calculator calculating a square sum of each of the data of the block to be coded and the first through third difference signals to obtain first through fourth square sums;

a square sum comparator, said square sum comparator comparing the first through fourth square sums with one another to select one of the first through fourth square sums that satisfies a predetermined condition and for outputting a selection signal indicating which of the first through fourth square sums is selected;

a selector responsive to the selection signal, said selector selecting one of the data of the block to be coded and the first through third difference signals;

a transformer, said transformer transforming a selected output of the selector to obtain a transformed signal;

a quantizer, said quantizer quantizing the transformed signal to obtain a quantized data; and an encoder, said encoder encoding the quantized data to obtain the output coded data.

* * * * *